US012371091B2

(12) United States Patent
Jalala

(10) Patent No.: US 12,371,091 B2
(45) Date of Patent: Jul. 29, 2025

(54) MULTIPURPOSE RIDING APPARATUS

(71) Applicant: Samara F. Jalala, Woodbridge, VA (US)

(72) Inventor: Samara F. Jalala, Woodbridge, VA (US)

( * ) Notice: Subject to any disclaimer, the term of this patent is extended or adjusted under 35 U.S.C. 154(b) by 353 days.

(21) Appl. No.: 18/052,153

(22) Filed: Nov. 2, 2022

(65) Prior Publication Data

US 2024/0140516 A1   May 2, 2024

(51) Int. Cl.
*B62B 9/12*   (2006.01)
*B62B 9/08*   (2006.01)
*B62B 9/14*   (2006.01)

(52) U.S. Cl.
CPC ............... *B62B 9/12* (2013.01); *B62B 9/085* (2013.01); *B62B 9/14* (2013.01)

(58) Field of Classification Search
CPC .. B62B 9/12; B62B 9/085; B62B 9/14; B62B 9/142; B62B 9/145; B62B 9/147; B62B 9/08; B62B 9/082; B62B 9/087; B62B 7/042; B62B 7/044; B62B 7/06; B62B 3/002

See application file for complete search history.

(56) References Cited

U.S. PATENT DOCUMENTS

| | | | |
|---|---|---|---|
| 5,709,400 A * | 1/1998 | Bonnier | B62B 7/08 280/47.38 |
| 6,298,949 B1 * | 10/2001 | Yang | B62B 9/085 280/658 |
| 6,315,309 B1 * | 11/2001 | Li | B62B 7/08 280/47.38 |
| 7,484,739 B2 * | 2/2009 | Nash, II | B62B 7/04 280/47.38 |
| 7,490,848 B2 * | 2/2009 | Wu | B62B 7/04 280/47.38 |

(Continued)

FOREIGN PATENT DOCUMENTS

| | | | | |
|---|---|---|---|---|
| CN | 106080728 A | * | 11/2016 | |
| CN | 110733551 A | * | 1/2020 | ............. B62B 7/008 |

(Continued)

OTHER PUBLICATIONS

Mechanical translation of DE-20204648-U1. (Year: 2002).*

*Primary Examiner* — John D Walters
(74) *Attorney, Agent, or Firm* — CIONCA IP Law P.C.

(57) ABSTRACT

A multipurpose riding apparatus having a chair body pivotally attached to a chair base, a seat associated with the chair body, a pair of front wheels rotationally attached to the chair body, a back wheel rotationally attached to the chair base; a brake attached to the chair body and associated with the back wheel, such that selective actuation of the brake prevents the rotation of the back wheel; an orientation lock associated with the chair body and the chair base, wherein the orientation lock is configured to selectively prevent rotation of the chair body about the chair base. The multipurpose riding apparatus may be ridden and controlled by a standing user that is standing on the chair base, while simultaneously holding a sitting user within the seat. The multipurpose riding apparatus may be folded into a compact package while not in use, thus facilitating easy storage and transport.

18 Claims, 14 Drawing Sheets

(56) References Cited

U.S. PATENT DOCUMENTS

| | | | | |
|---|---|---|---|---|
| 8,070,179 B2 * | 12/2011 | Pike | .......................... | B62B 7/10 |
| | | | | 280/642 |
| 9,637,155 B1 * | 5/2017 | Cheng | ....................... | B62B 7/08 |
| 9,868,456 B2 * | 1/2018 | Stiba | .......................... | B62B 9/28 |
| 11,447,168 B1 * | 9/2022 | Ferrer | ....................... | B62B 9/20 |

FOREIGN PATENT DOCUMENTS

| | | | | |
|---|---|---|---|---|
| DE | 20204648 U1 * | 7/2002 | ........... | B62B 5/0438 |
| DE | 202023104827 U1 * | 12/2023 | ............... | B62B 7/06 |

* cited by examiner

MULTIPURPOSE RIDING APPARATUS

BACKGROUND OF INVENTION

1. Field of the Invention

The invention relates generally to riding apparatuses and specifically to multipurpose riding apparatuses that may be easily folded between stowed and deployed orientations.

2. Description of the Related Art

Strollers and similar devices are commonly used to allow a standing user, such as an adult, to transport a sitting user, such as a child, by having the standing user push the stroller while the sitting user is seated within it. While this mechanism may provide a comfortable means of transport for the sitting user, it requires the standing user to be walking the whole time, with no means for them to ride the stroller with the sitting user. If the standing user were to attempt to ride the stroller, a lack of suitable stability and means of controlling stroller speed would prove to be dangerous for the sitting user and standing user alike. Many stroller and similar devices available in the industry have limited capabilities and functionalities, thus merely being relegated to a form of transportation for the sitting user.

Therefore, there is a need to solve the problems described above by providing a device and method for a multipurpose riding apparatus capable of providing a standing user with a scooter style vehicle that may simultaneously or alternatively being used as a stroller or chair by a sitting user.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a multipurpose riding apparatus is provided, the multipurpose riding apparatus comprising: a chair body; a seat associated with the chair body, wherein the seat is configured to hold a sitting user; a chair base pivotally attached to the chair body, wherein the chair base is configured to be stood upon by a standing user to allow the standing user to travel on the multipurpose riding apparatus; a pair of front wheels rotationally attached to a front end of the multipurpose riding apparatus, wherein the front wheels are configured to rotate about a front wheel rotational axis; a back wheel rotationally attached to the chair base, wherein the back wheel is configured to rotate about a back wheel rotational axis, wherein the back wheel is further configured to pivot about the chair base to facilitate directional turning of the multipurpose riding apparatus; and a brake attached to the chair body and associated with the back wheel, wherein the brake is configured to be selectively actuated to prevent rotation of the back wheel about the back wheel rotational axis; wherein the multipurpose riding apparatus is configured to be selectively locked into a deployed orientation. Thus, an advantage is that the multipurpose riding apparatus may be folded into a smaller, more compact form while not in use by selectively unlocking it from the deployed orientation, to facilitate easy transit or storage. Another advantage is that the multipurpose riding apparatus may have its speed controlled by the standing user through selective actuation of the brake, thus providing the standing user with a safe mechanism to decelerate and stop the multipurpose riding apparatus during use. Another advantage is that the sitting user may be provided with a variety of amenities including cupholders, armrests and a passenger shade to enhance their comfort. Another benefit is that the standing user may choose to selectively ride the multipurpose riding apparatus, such that the user is not always required to walk to travel along with the multipurpose riding apparatus, allowing the multipurpose riding apparatus to transport the standing user and potentially a sitting user based upon the momentum of the multipurpose riding apparatus. Another advantage is that an orientation lock may allow the multipurpose riding apparatus to be deployed by simply fully unfolding it, while subsequent refolding of the chair is only allowed through selective actuation of corresponding orientation lock elements, thus preventing unintended collapse during use.

In another aspect, a multipurpose riding apparatus is provided, the multipurpose riding apparatus comprising: a chair body; a seat associated with the chair body, wherein the seat is configured to hold a sitting user; a chair base pivotally attached to the chair body; a pair of front wheels rotationally attached to a front end of the multipurpose riding apparatus; a back wheel rotationally attached to the chair base; and a brake attached to the chair body and associated with the back wheel, wherein the brake is configured to selectively prevent rotation of the back wheel about a back wheel rotational axis; wherein the multipurpose riding apparatus is configured to be selectively locked into a deployed orientation and the chair base is configured to be stood upon by a standing user to allow the standing user to travel on the multipurpose riding apparatus. Again, an advantage is that the multipurpose riding apparatus may be folded into a smaller, more compact form while not in use by selectively unlocking it from the deployed orientation, to facilitate easy transit or storage. Another advantage is that the multipurpose riding apparatus may have its speed controlled by the standing user through selective actuation of the brake, thus providing the standing user with a safe mechanism to decelerate and stop the multipurpose riding apparatus during use. Another advantage is that the sitting user may be provided with a variety of amenities including cupholders, armrests and a passenger shade to enhance their comfort. Another benefit is that the standing user may choose to selectively ride the multipurpose riding apparatus, such that the user is not always required to walk to travel along with the multipurpose riding apparatus, allowing the multipurpose riding apparatus to transport the standing user and potentially a sitting user based upon the momentum of the multipurpose riding apparatus. Another advantage is that an orientation lock may allow the multipurpose riding apparatus to be deployed by simply fully unfolding it, while subsequent refolding of the chair is only allowed through selective actuation of corresponding orientation lock elements, thus preventing unintended collapse during use.

In another aspect, a multipurpose riding apparatus is provided, the multipurpose riding apparatus comprising: a chair body; a seat associated with the chair body; a chair base pivotally attached to the chair body; a back wheel rotationally attached to the chair base; and a brake attached to the chair body and associated with the back wheel, wherein the brake is configured to selectively prevent rotation of the back wheel about a back wheel rotational axis; wherein the multipurpose riding apparatus is configured to be selectively locked into a deployed orientation. Again, an advantage is that the multipurpose riding apparatus may be folded into a smaller, more compact form while not in use by selectively unlocking it from the deployed orientation, to facilitate easy transit or storage. Another advantage is that the multipurpose riding apparatus may have its speed controlled by the standing user through selective actuation of the brake, thus providing the standing user with a safe mechanism to decelerate and stop the multipurpose riding apparatus during use. Another advantage is that the sitting user may be provided with a variety of amenities including cupholders, armrests and a passenger shade to enhance their comfort. Another benefit is that the standing user may choose to selectively ride the multipurpose riding apparatus, such that the user is not always required to walk to travel along with the multipurpose riding apparatus, allowing the multipurpose riding apparatus to transport the standing user and potentially a sitting user based upon the momentum of the multipurpose riding apparatus. Another advantage is that an orientation lock may allow the multipurpose riding apparatus to be deployed by simply fully unfolding it, while subsequent refolding of the chair is only allowed through selective actuation of corresponding orientation lock elements, thus preventing unintended collapse during use.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1A:
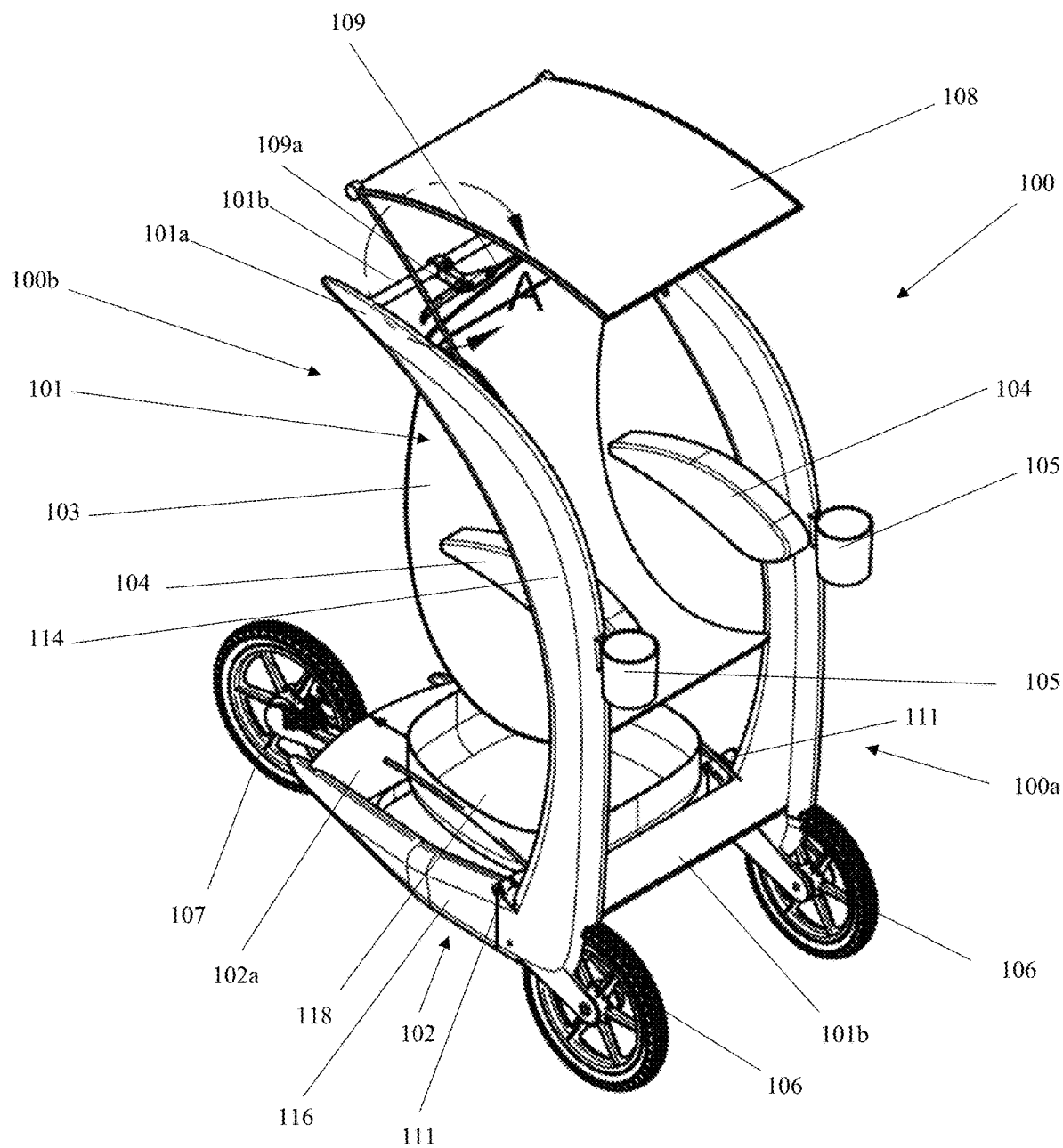
FIG. 1A illustrates the perspective view of the disclosed multipurpose riding apparatus having a reference area A, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 103 and 203, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 1B:
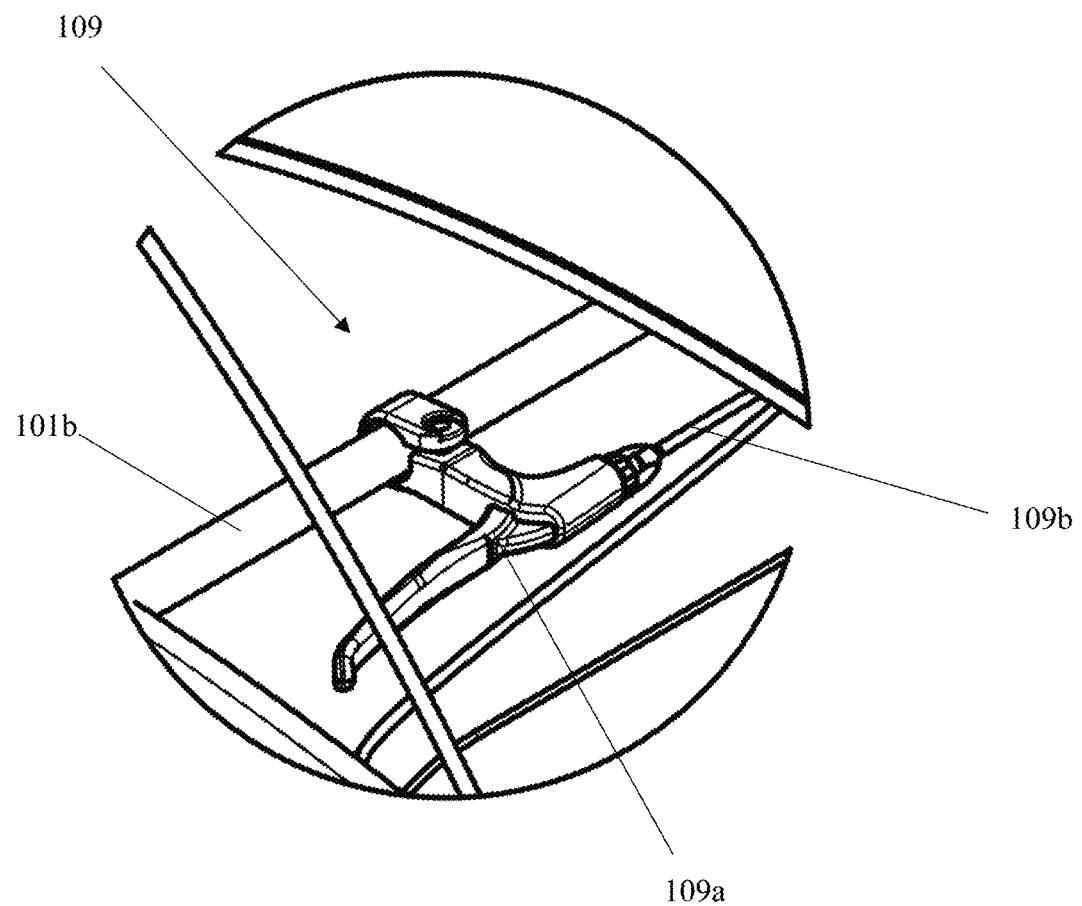
FIG. 1B illustrates the enlarged perspective view of reference area A of FIG. 1A, according to an aspect.

FIG. 1A illustrates the perspective view of the disclosed multipurpose riding apparatus 100 having a reference area A, according to an aspect. FIG. 1B illustrates the enlarged perspective view of reference area A of FIG. 1A, according to an aspect. The disclosed multipurpose riding apparatus ("riding apparatus", "scooter chair", "foldable scooter chair", "rider chair", "foldable rider chair") 100 is configured to provide a standing user (a driver) with a means to travel a distance by propelling said multipurpose riding apparatus 100 and then standing on said multipurpose riding apparatus as it travels on its plurality of wheels 106, 107. In addition to providing a standing user with a means of travel, a sitting user (a seated passenger) may also be provided with means of travel, but while positioned is a seated position within the seat 103 of the multipurpose riding apparatus 100. In an embodiment, a standing user may propel themselves, as well as the sitting user, by pushing and riding on the multipurpose riding apparatus 100. In an alternative embodiment, the standing user may propel only themselves by pushing and riding on the multipurpose riding apparatus 100. In said alternative embodiment, the standing user may utilize the seat 103 to rest while the multipurpose riding apparatus is not in motion.

Figure 8A:
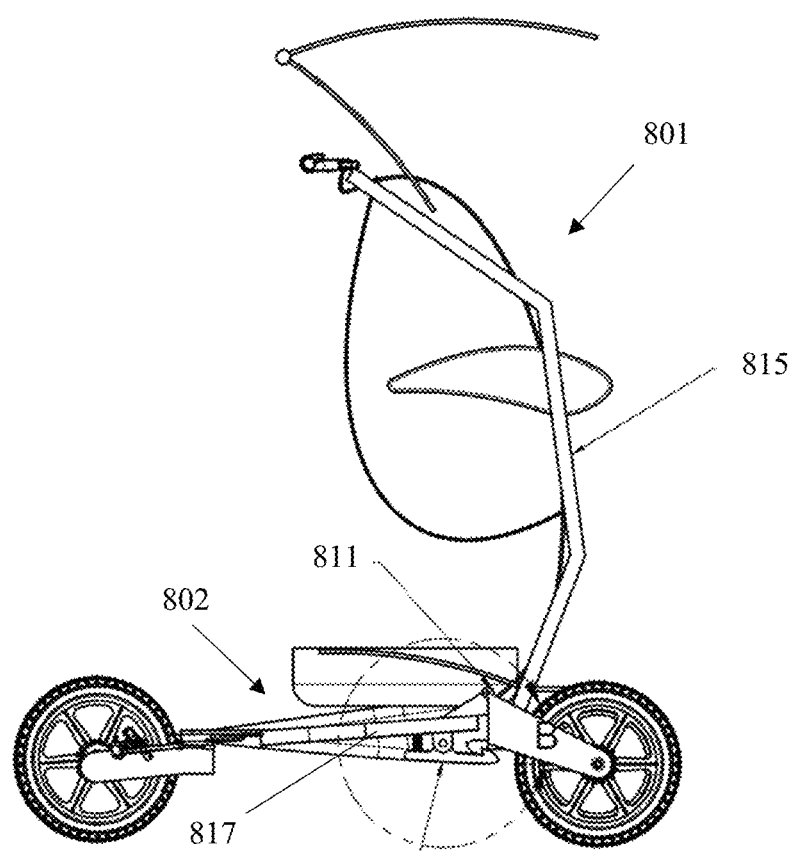
FIG. 8A illustrates the left side cross-sectional view of the disclosed multipurpose riding apparatus in the deployed orientation with a reference area B, according to an aspect.

The multipurpose riding apparatus 100 may be comprised of a chair body 101 that is configured to engage with a chair base 102 to provide a suitable housing for each of the functional element of the disclosed herein. The multipurpose riding apparatus 100 is configured to be selectively folded between an open, deployed orientation as seen in FIG. 8A and a closed, stowed orientation as seen in FIG. 10B. As such, the multipurpose riding apparatus 100 is configured to be selectively locked into a deployed orientation to prevent the multipurpose riding apparatus 100 from collapsing during use. In order to facilitate this functionality, the chair body 101 may be pivotally engaged with the chair base 102 and have the pivoting of the multipurpose riding apparatus 100 be controlled by an orientation lock, such as orientation lock 810 of FIG. 8B. The structure of this orientation lock will be discussed in greater detail hereinbelow. The pivoting of the chair body 101 about the chair base 102 may itself be facilitated by pivot hinges 111 disposed on opposing lateral sides of the multipurpose riding apparatus 100 between the chair body 101 and chair base 102.

The chair body 101 may be comprised of a body clamshell 114 surrounding or encasing a metal body frame, such as metal body frame 815 of FIG. 8A. The chair base 102 may be comprised of a base clamshell 116 surrounding or encasing a metal base frame, such as metal base frame from 817 of FIG. 8A. The chair body 101 may form a set of handles 101a that the standing user may engage with in order to easily control and propel the multipurpose riding apparatus 100 from its rear 100b. In order to facilitate a pivotal attachment between the chair body 101 and the chair base 102, the metal body frame may be pivotally engaged directly with the metal base frame, wherein the body clamshell 114 and base clamshell 116 may merely cover the metal body frame 815 and metal base frame 817, respectively.

In order to allow the standing user to ride the multipurpose riding apparatus 100 while it is in motion, a standing platform 102a may be provided on the chair base 102 for the standing user to stand on. The standing user may ride the multipurpose riding apparatus 100 by holding the multipurpose riding apparatus 100 by the handles 101a, propelling the multipurpose riding apparatus 100 and then standing on the standing platform 102a as the multipurpose riding apparatus 100 rolls on the ground. In an embodiment, a brake 109 may be attached to the chair body, or more specifically to the set of handles 101a, such that the standing user may selectively slow or stop the multipurpose riding apparatus 100 from moving by actuating said brake 109. In an embodiment, the brake 109 may allow a standing user to prevent the multipurpose riding apparatus 100 from accelerating uncontrollably, such as when traveling down a hill. The user may engage with a brake handle 109a in order to control the brakes. In an embodiment, the brake handle 109a may be attached to a center support 101b, wherein the center support 101b is disposed between and associated with the two opposing handles 101a, such as left handle 601a-1 and right handle 601a-2 of FIG. 6, to position the brake handle 109a in an easy to reach location. The brake 109 of the disclosed multipurpose riding apparatus 100 will be discussed in greater detail hereinbelow.

In order to protect the sitting user from direct sunlight or rain, a passenger shade 108 may be associated with the chair body 101 and disposed above the chair 103. This passenger shade 108 may be selectively deployed into an operational position, as seen in FIG. 1A, such that the passenger shade 108 rests above the seated passenger, blocking the sitting user from sun, rain, etc. When coverage of the passenger is not desired, the passenger shade 108 may be folded downward such that it is no longer above the seat 103 and the sitting user. Other comfort amenities that may be provided for use by the seated passenger include cup holders 105 and armrests 104, which may be attached to the chair body 101 such that they are suitably positioned to the left and/or right of a seated passenger. Similarly to the passenger shade 108, the armrests 103 may be configured to be selectively folded to allow for their selective utilization by the seated passenger based upon their preference. A storage basket 118 may be secured to the chair base 102 below the seat 103 to allow the disclosed multipurpose riding apparatus 100 to securely hold items. This storage basket 118 may be easily accessed by both the standing user and the sitting user.

The disclosed multipurpose riding apparatus 100 may utilize a plurality of wheels 106, 107 in order to allow the multipurpose riding apparatus 100 to roll easily when propelled. In an embodiment, a pair of front wheels 106 may be rotationally attached to the front end 100a of the multipurpose riding apparatus 100, whereas a singular back wheel 107 may rotationally attached to the rear end 100b of the multipurpose riding apparatus 100. In an embodiment, the front wheels 106 may be rotationally attached to the chair body 101 and the back wheel may be rotationally attached to the chair base 102. The back wheel 107 may be associated with the brake 109 to provide selective braking capabilities, as will be discussed hereinbelow. The back wheel 107 may be configured to rotate freely about its own radial axis (e.g., to facilitate the rolling of the wheel) as well as about its attachment to the chair base 102, to allow the back wheel 107 to be used to steer the multipurpose riding apparatus 100 more easily. It should be understood that using the term "rotationally" in reference to the connections of the wheels 106, 107 refers to the wheels being attached to their corresponding mounting structure in a manner that allows the wheels to rotate about their corresponding rotation axis, as described herein.

It should be understood that the general dimensions of the disclosed multipurpose riding apparatus 100 should be suited to those intended to operate and use it, as a multipurpose riding apparatus 100 configured to be operated by an adult may have handles 101a that are at a suitable elevation to be comfortably reached by adult. In an embodiment, the multipurpose riding apparatus 100 may have a height of about 47.5 inches when measured from the bottom of the back wheel 107 to the top of the handles 101a. In the same embodiment, the multipurpose riding apparatus 100 may have a length of about 46 inches from the back of the back wheel 107 to the front of the front wheels 106 and width of about 22 inches between the outermost edges of the two opposing cup holders 105. It should be understood that by folding the multipurpose riding apparatus 100 as described herein, the height of the multipurpose riding apparatus 100 may be significantly reduced, making it less cumbersome to transport and easier to store while not in use.

The sizes of the wheels 106, 107 may also be suitably adjusted based on the intended use of the multipurpose riding apparatus 100, as long as the sizes of the wheels do not interfere with their ability to engage with the multipurpose riding apparatus 100 and roll smoothly. In the disclosed embodiment of FIG. 1A, it may not be possible to increase the size of the back wheel 107 as a result of how it engages with the wheel pivot joint, such as wheel pivot joint 702b of FIG. However, suitable modifications the length/size of the wheel pivot joint secured to the base 102 to accommodate any practical wheel size and width may be made as needed, based on the needs of the stroller. In an embodiment, the front wheels 106 and back wheel 107 may be the same size, and both the front and back wheels 106, 107 may have a diameter of about 11.4 inches. In certain embodiments, the sizes of the front wheels 106 may differ from that of the back 107. Similarly, different models of wheels having different tread depths, coefficients of friction, etc., may also be utilized with the disclosed riding apparatus 100 of FIG. 1A, so long as they do not negatively influence device function and attach through a comparable mechanism. Additionally, different quantities of front wheels 106 and back wheels 107 may be utilized, so long as the wheels are suitably positioned to not interfere with device functionality as described herein.

Figure 2:
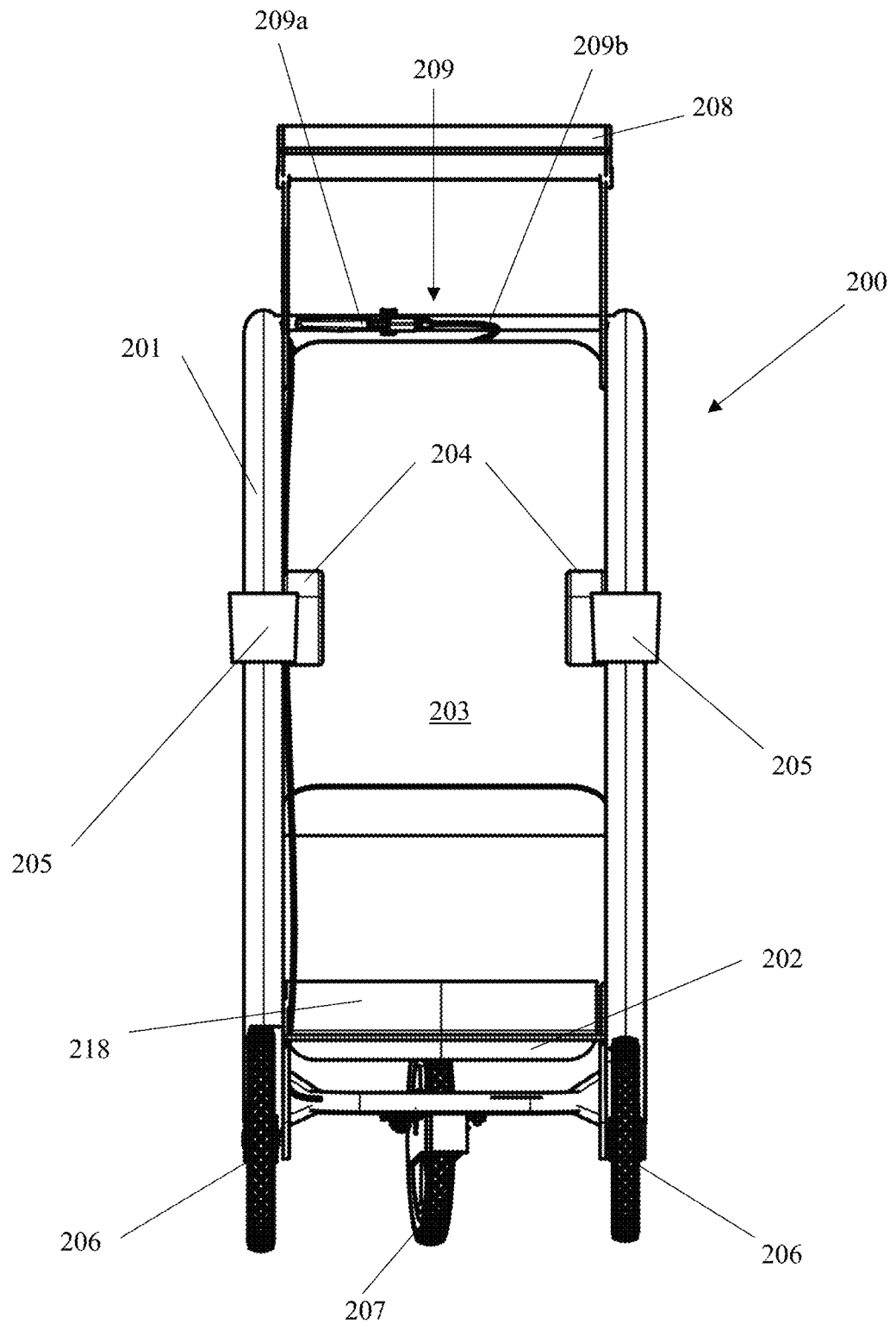
FIG. 2 illustrates the front elevation view of the disclosed multipurpose riding apparatus, according to an aspect.
Figure 3:
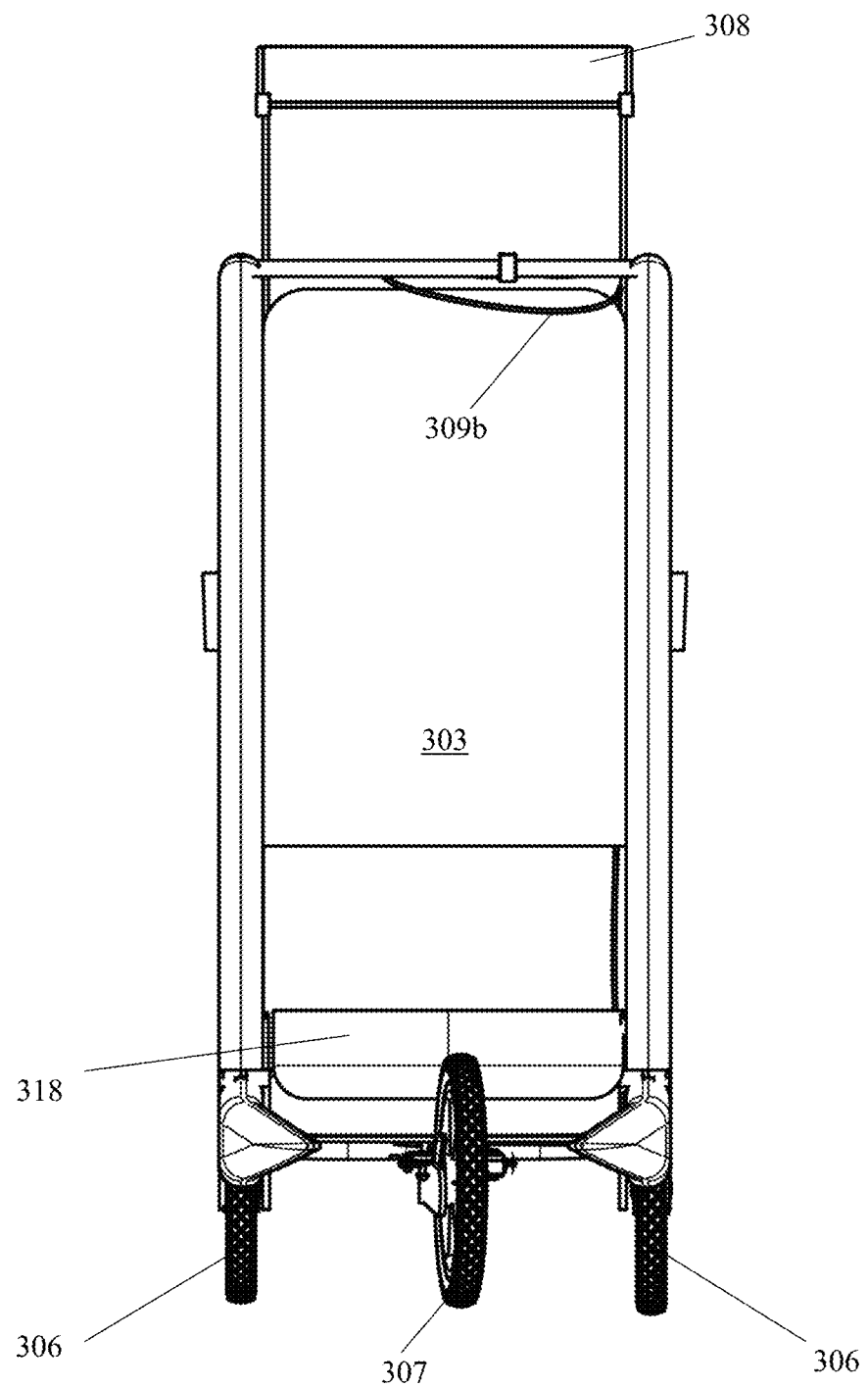
FIG. 3 illustrates the rear elevation view of the disclosed multipurpose riding apparatus, according to an aspect.

FIG. 2 illustrates the front elevation view of the disclosed multipurpose riding apparatus 200, according to an aspect. FIG. 3 illustrates the rear elevation view of the disclosed multipurpose riding apparatus 300, according to an aspect. As disclosed hereinabove, the multipurpose riding apparatus 200, 300 is configured to facilitate a variety functions and capabilities for both/either a sitting user and/or a standing user. The disclosed brake 209 may be comprised of a handle, such as brake handle 209a, a brake disc, drum, pad, shoe or other suitable braking device, such as braking device 709c of FIG. 7, and a brake cable 209b, 309b associated with the braking device and brake handle 209a, wherein the braking device is directly engaged with the back wheel 207, 307. As such, a standing user propelling and/or riding the multipurpose riding apparatus 200, 300 may selectively actuate with the brake handle 209a to engage the braking device associated with the back wheel 307 to slow and eventually stop the motion of the front wheels 206, 306 and back wheel 207, 307, and thus the motion of the multipurpose riding apparatus 200, 300. This brake 209, 309 may help provide a safe riding experience for both a standing user and a sitting user using the multipurpose riding apparatus 200, 300.

As disclosed hereinabove, the various elements of the disclosed multipurpose riding apparatus 200, 300 may be provided for the comfort and convenience of a sitting user. Cupholders 204 and armrests 205 pivotally attached to the chair body 201 and may be positioned to allow the sitting user on the seat 203, 303 to reach/use each of these elements in accordance with their functionality. For example, the cupholders 204 may be positioned such that they are within the reach of the sitting user to facilitate easy access. In another example, the armrests 205 may be positioned such that a sitting user may rest/support their arms on them while they assume a seated, relaxed position within the seat 203, 303. Furthermore, the storage basket 218, 318 secured to the chair base 202 below the seat 203, 303 may be positioned such that a sitting user within the seat 203, 303 may reach below said seat 203, 303 to easily access the contents of the storage basket 218, 318. The storage basket 218, 318 may also be made such that it is also accessible to the standing user.

Figure 4:
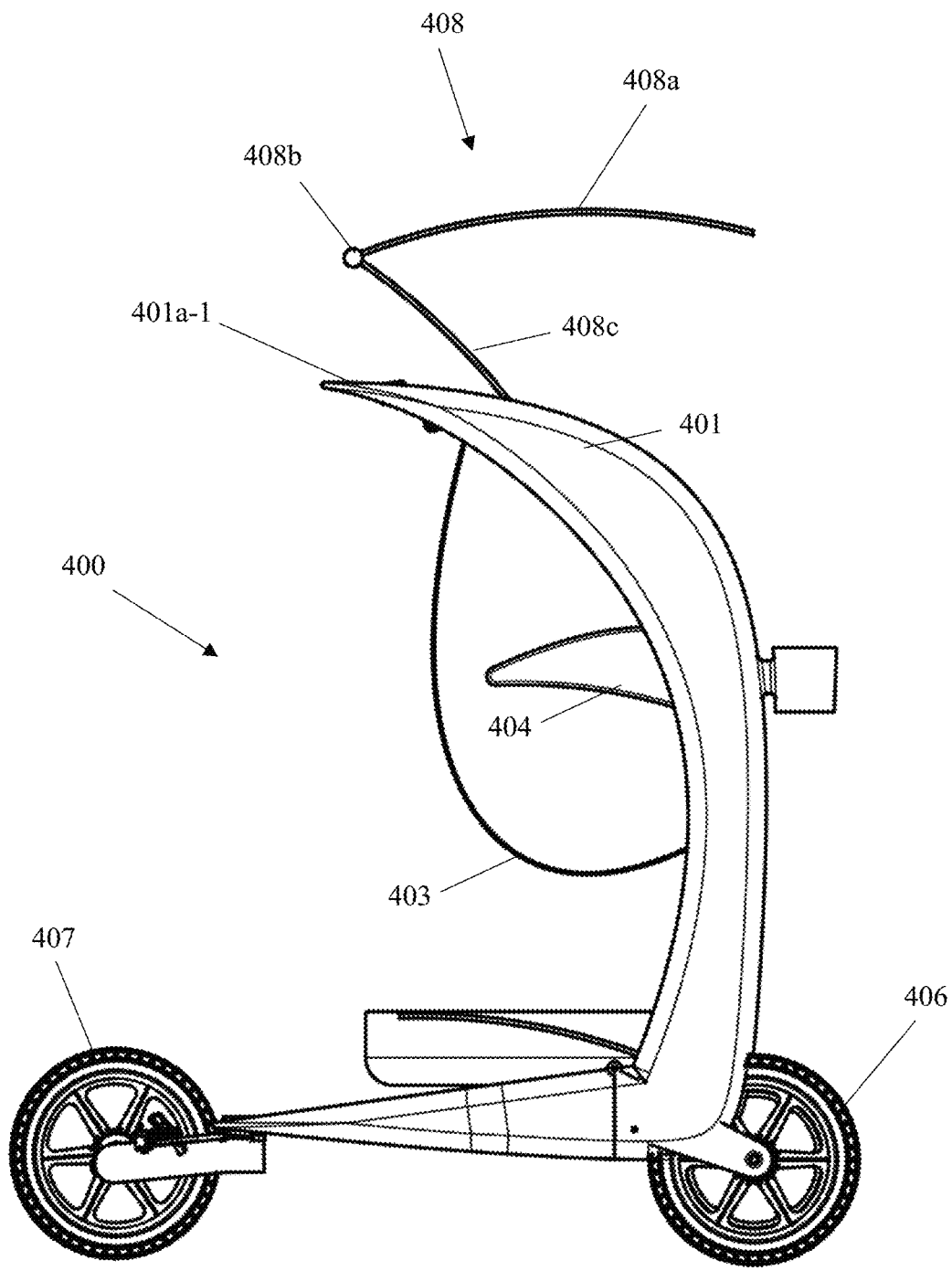
FIG. 4 illustrates the left side elevation view of the disclosed multipurpose riding apparatus, according to an aspect.
Figure 5:
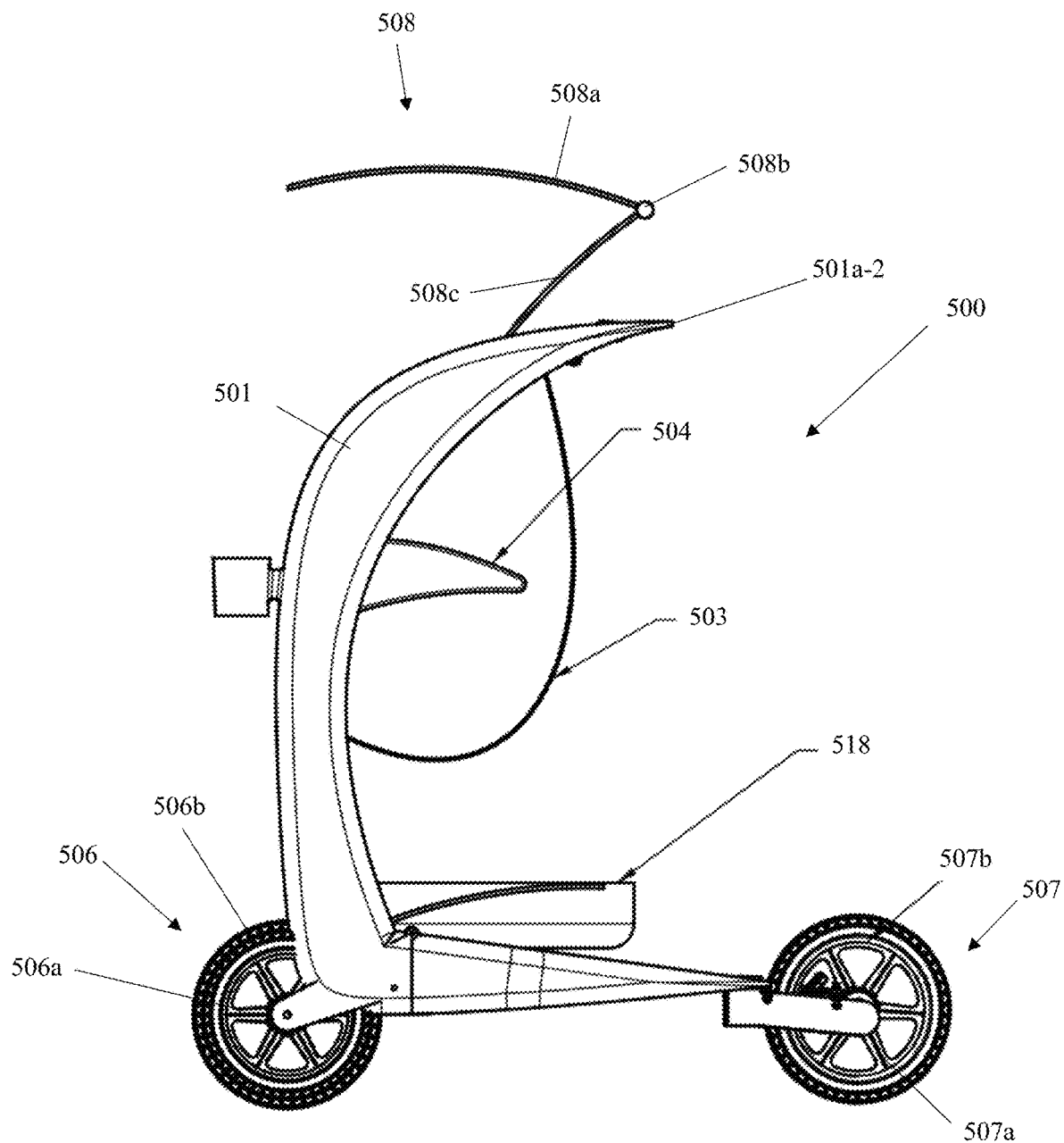
FIG. 5 illustrates the right side elevation view of the disclosed multipurpose riding apparatus, according to an aspect.

FIG. 4 illustrates the left side elevation view of the disclosed multipurpose riding apparatus 400, according to an aspect. FIG. 5 illustrates the right side elevation view of the disclosed multipurpose riding apparatus 500, according to an aspect. In order to provide the desired functionality of having a passenger shade 408 that may be selectively pivoted to protect a seated passenger, the passenger shade 408, 508 may be provide with several distinct components. The passenger shade 408, 508 may be comprised of a shade mount 408c, 508c attached to the chair body 401, 501, a shade pivot 408b, 508b associated with the shade mount 408c, 508c and a shade canopy 408a, 508a associated with the shade pivot 408b, 508b, such that the shade canopy 408a 508a is pivotally attached to the shade mount 408c, 508c. As such, in an embodiment, the shade canopy 408a, 508a may be configured such that it is above the seat 403, 503 while it is in a deployed orientation, as seen in FIG. 4-5, to protect a sitting user from rain, direct sunlight or other potential hazards or sources of discomfort. In said embodiment, the shade canopy 408a, 508a may be configured to pivot about the shade pivot 408b, 508b such that the shade canopy 408a, 508a is no longer above the seat 403, 503 when the protective cover provided by the shade canopy 408a, 508a to the seated passenger is no longer necessary or desirable.

As can be seen from FIG. 4-5, the front wheels 406, 506 and the back wheels 407, 507 of the disclosed multipurpose riding apparatus 400, 500 may be approximately the same size. As disclosed hereinabove, the size, shape and characteristics of each wheel may be varied based upon the application/intended use of the riding apparatus 400, 500, as well as the ages of the users (seated and standing) the device is configured for. Furthermore, the overall dimensions of the multipurpose riding apparatus 400, 500, as well as the materials used for each of its components may also be varied based upon the needs of the users.

In an embodiment the clamshells, such as body clamshell 114 and base clamshell 116 may be made of a hard plastic or other durable material to prevent their damage during standard usage and moderate impacts. The seat 403, 503 may be made from a suitably durable but comfortable materials, such as cloth or fabric, that has the required strength to support the sitting user while still providing a comfortable seating surface. The passenger shade 508 may be made of lightweight, opaque, and impermeable (or sufficiently water resistant) material, such as plastic or cloth, to provide protection against both sunlight and rain. The wheels 506, 507 may have a durable hub portion 506a, 507a made of a suitably high strength material, such as a high strength plastic or metal, such as steel. The wheels 506, 507 may also have a tire 506b, 507b surrounding and engaged with the hub 506a, 507a, wherein the tire 506b, 507b is made of a material configured to suitably grip the driving surface, such as rubber.

In the same embodiment, the metal body frame, such as metal body frame 815 of FIG. 8A, and metal base frame, such as metal base frame 817 of FIG. 8A, may be made of a suitably strong, but sufficiently lightweight metal material, such as steel or aluminum. The metal used for the metal frames 815, 817 may be cold rolled or prepared by any other suitable mechanism to achieve the desired strength and finish. The cupholders and armrests may also be made of a lightweight, but moderately durable material, such as plastic. The other components of the multipurpose riding apparatus 400, 500, such as the armrests 404, 504 may be made of suitably durable materials, such as plastics metals, to ensure the multipurpose riding apparatus isn't damaged or deformed during usage. It should be understood that any materials that are suitably durable and achieve the desired characteristics of their corresponding component may be used in the construction of the disclosed multipurpose riding apparatus 400, 500.

In order to allow the standing user to easily push and ride the multipurpose riding apparatus 400, 500 a pair of handles comprising a left handle 401a-1 and a right handle 501a-2 may be provided as part of the chair body 401, 501. These handles may be suitably shaped to be easy to grip and suitably robust while using an optimized amount of material to do so. As can be seen in FIG. 4-5, the left handle 401a-1 may be symmetrical to the right handle 501a-1. In alternative embodiments, the handles 401a-1, 501a-2 may instead be asymmetrical to achieve certain device functions and performance as necessary.

Figure 6:
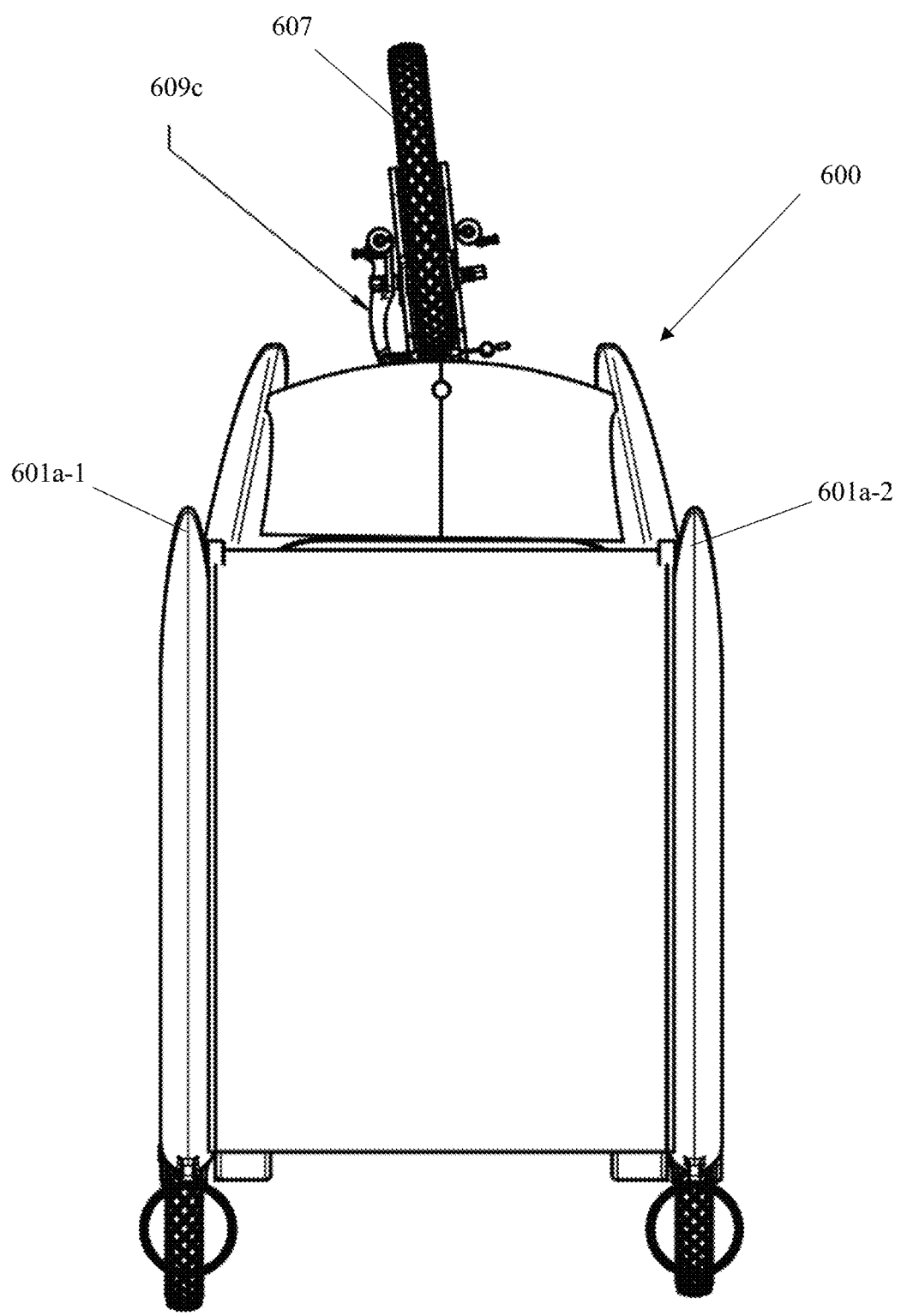
FIG. 6 illustrates the top plan view of the disclosed multipurpose riding apparatus, according to an aspect.
Figure 7A:
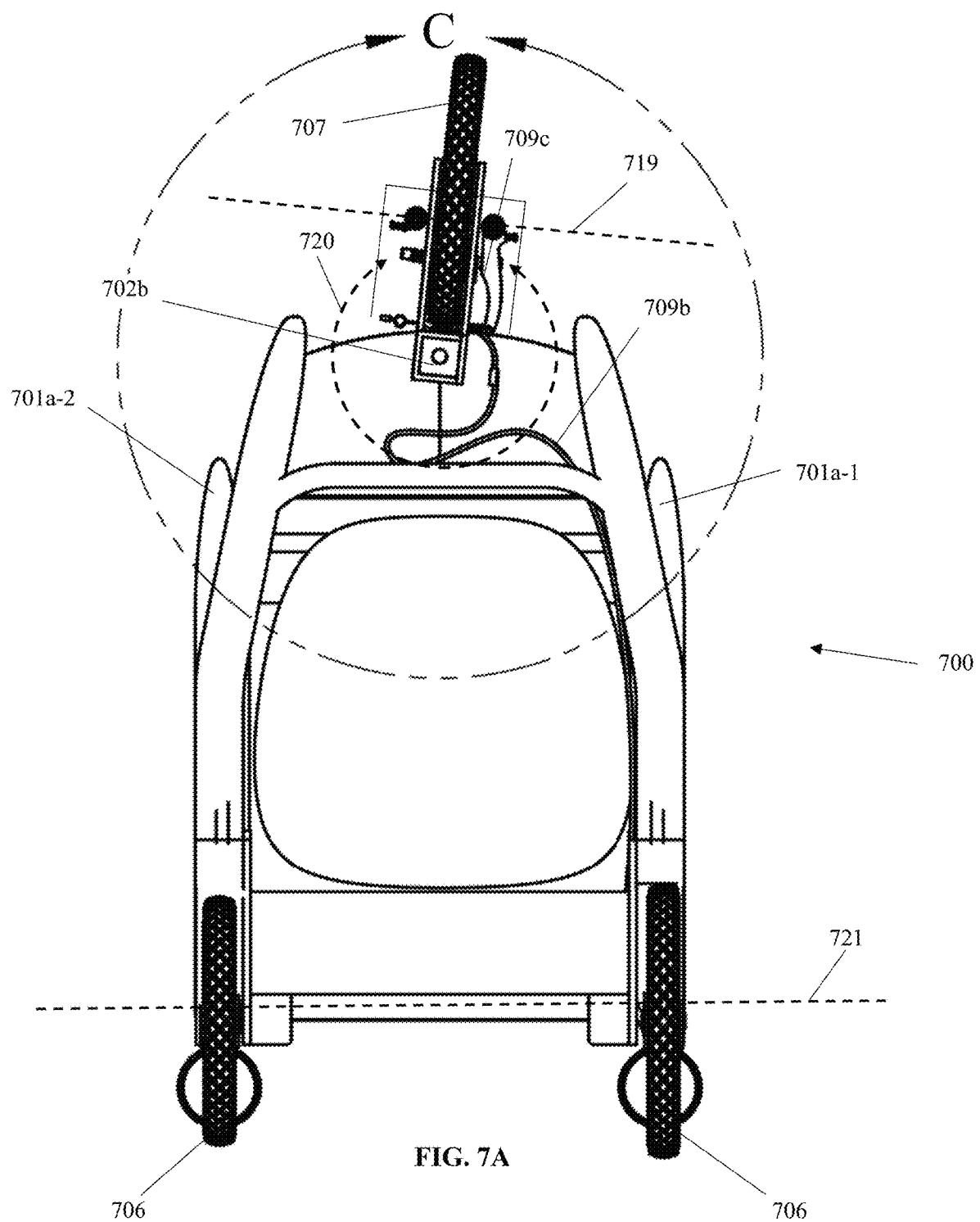
FIG. 7A illustrates the bottom plan view of the disclosed multipurpose riding apparatus having reference area C, according to an aspect.
Figure 7B:
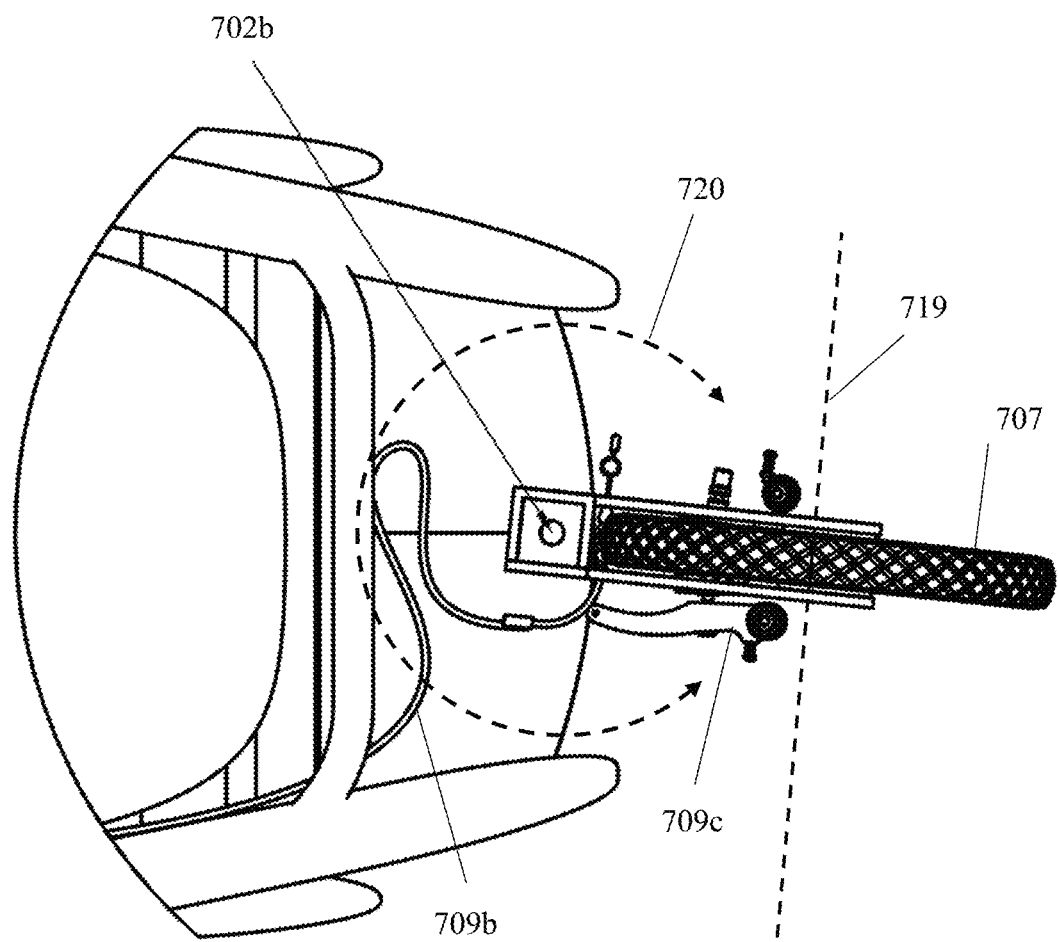
FIG. 7B illustrates the bottom plan view of reference area C from FIG. 7A, according to an aspect.

FIG. 6 illustrates the top plan view of the disclosed multipurpose riding apparatus 600, according to an aspect. FIG. 7A illustrates the bottom plan view of the disclosed multipurpose riding apparatus 700, according to an aspect. FIG. 7B illustrates the bottom plan view of reference area C from FIG. 7A, according to an aspect. As can be seen from both top plan view of FIG. 6 and the bottom plan view of FIG. 7A, the left handles 601a-1, 701a-1 and right handles 601a-2, 701a-2 of the multipurpose riding apparatus may be symmetrical.

As described hereinabove, the back wheel 607, 707 may be engaged with the braking system 609c, 709c. The braking system 609c, 709c may be configured such that the standing user may manipulate a brake handle, such as brake handle 209a in order to engage the braking system 609c to stop the rotation of the back wheel 607, 707, and thus the movement of the multipurpose riding apparatus 600, 700. The braking system 609c, 709c may be secured to the brake handle, such as brake handle 209a of FIG. 2, by a brake cable 709b, thus allowing a standing users manipulation of the brake handle to selectively engage the braking system 609c, 709c. The braking system 609c, 709c may utilize brake pads, compression drums or any other know braking device or technology that is capable of slowing and stopping the rotation of the back wheel 607, 707.

As can be seen in FIG. 7A-7B, a wheel pivot joint 702b may be pivotally attached to the chair base 702, such that the back wheel 707 is pivotally and rotationally attached to the chair base 201. The back wheel 707 may be rotationally attached to said wheel pivot joint 702b, such that the wheel may not only rotate about its back wheel rotational axis 719 but also pivot orthogonally to the rotational axis about the chair base 702, as indicated by pivotal turning arrow 720. In this way, the back wheel 707 may be configured not only to rotate about the back wheel rotational axis 719 to allow for easy travel of the multipurpose riding apparatus 700 via rolling of the back wheel 707, but to also allow the back wheel 707 to pivot 720 about the pivotal attachment of wheel pivot joint 702b to the chair base 702, to allow the multipurpose riding apparatus 700 to turn to change its travel direction more easily. In contrast to the back wheel 707, the front wheels 706 may be rotationally attached the chair body 701 such that they may only roll about their shared front wheel rotational axis 721. In alternative embodiments, the front wheels 706 may also be attached to chair body 701 by corresponding wheel pivot joints (not shown) or swivel castors (not shown) to allow for omnidirectional rolling of the multipurpose riding apparatus 700 during travel, but smaller wheels and/or an alternative riding apparatus structure may be necessary to implement these successfully in certain embodiments.

It should be understood that the terms "pivot", "pivoting", "pivotally attached" and other pivot-based terms describes the turning of the back wheel 707 orthogonally to the wheel rotational axis 719, as articulated by pivot arrow 720, when discussed in the context of back wheel 707 motion. In contrast, the terms "rotate", "rotating", "rotationally attached" and other rotation-based terms describes the rotation of a wheel 707, 706 about its corresponding rotational axis. For example, the rotational attachment of the back wheel 707 to the chair base 702 facilitates the rotation of the back wheel 707 about the back wheel rotational axis 719, whereas the pivotal attachment of the back wheel 707 to the chair base 702 facilitates the pivoting of the back wheel for turning purposes, as articulated by pivot arrow 720.

Figure 8B:
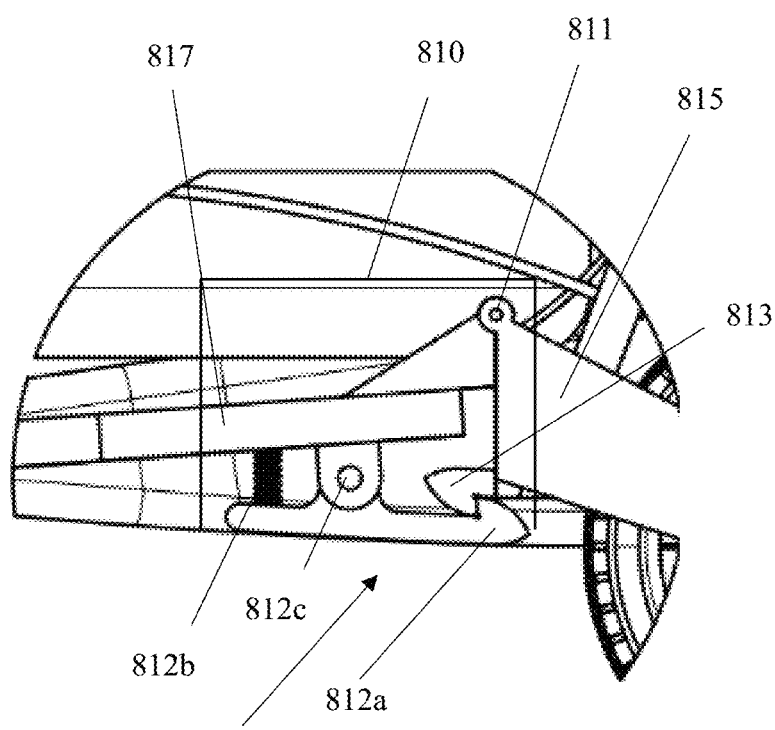
FIG. 8B illustrates the left side cross-sectional view of reference area B from FIG. 8A while the multipurpose riding apparatus is in the deployed orientation, according to an aspect.

FIG. 8A illustrates the left side cross-sectional view of the disclosed multipurpose riding apparatus 800 in the deployed orientation with a reference area B, according to an aspect. FIG. 8B illustrates the left side cross-sectional view of reference area B from FIG. 8A while the multipurpose riding apparatus 800 is in the deployed orientation, according to an aspect. As can be seen in FIG. 8A-8B, a metal body frame 815 may be enclosed with the body clamshell, such as body clamshell 114 of FIG. 1A, in order to provide the chair body 801 with the required strength and structural rigidity. Similarly, a metal base frame 817 may be enclosed within the base clamshell, such as base clamshell 116 of FIG. 1A, in order to provide the chair base 802 with the required strength and structural rigidity.

Figure 10A:
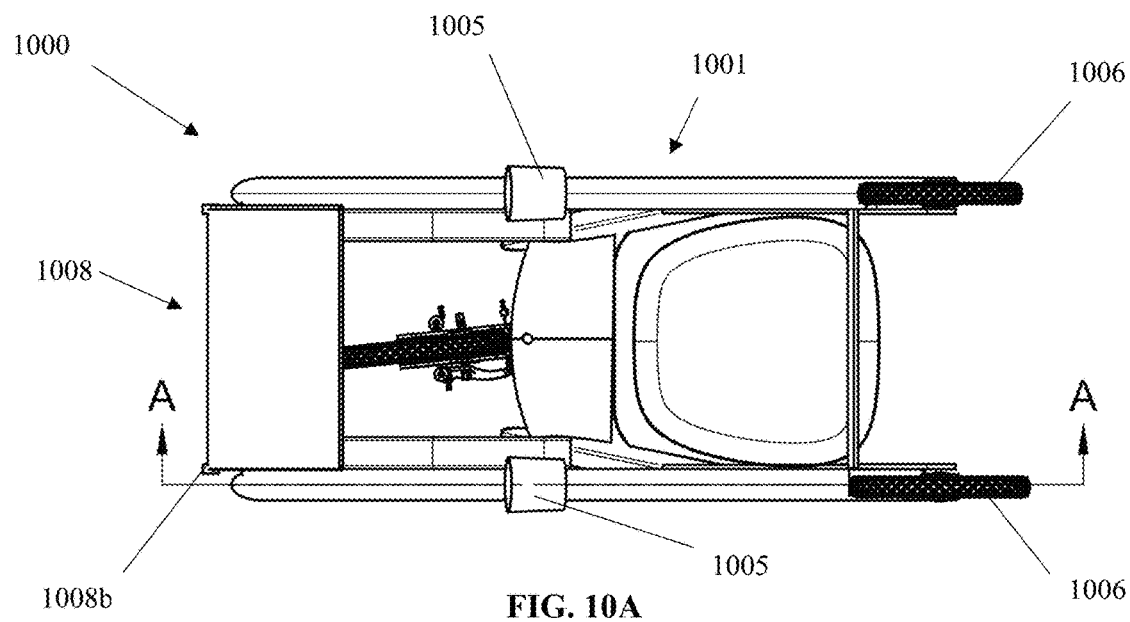
FIG. 10A illustrates a top view of the disclosed multipurpose riding apparatus in a folded orientation with a reference plane A.
Figure 10B:
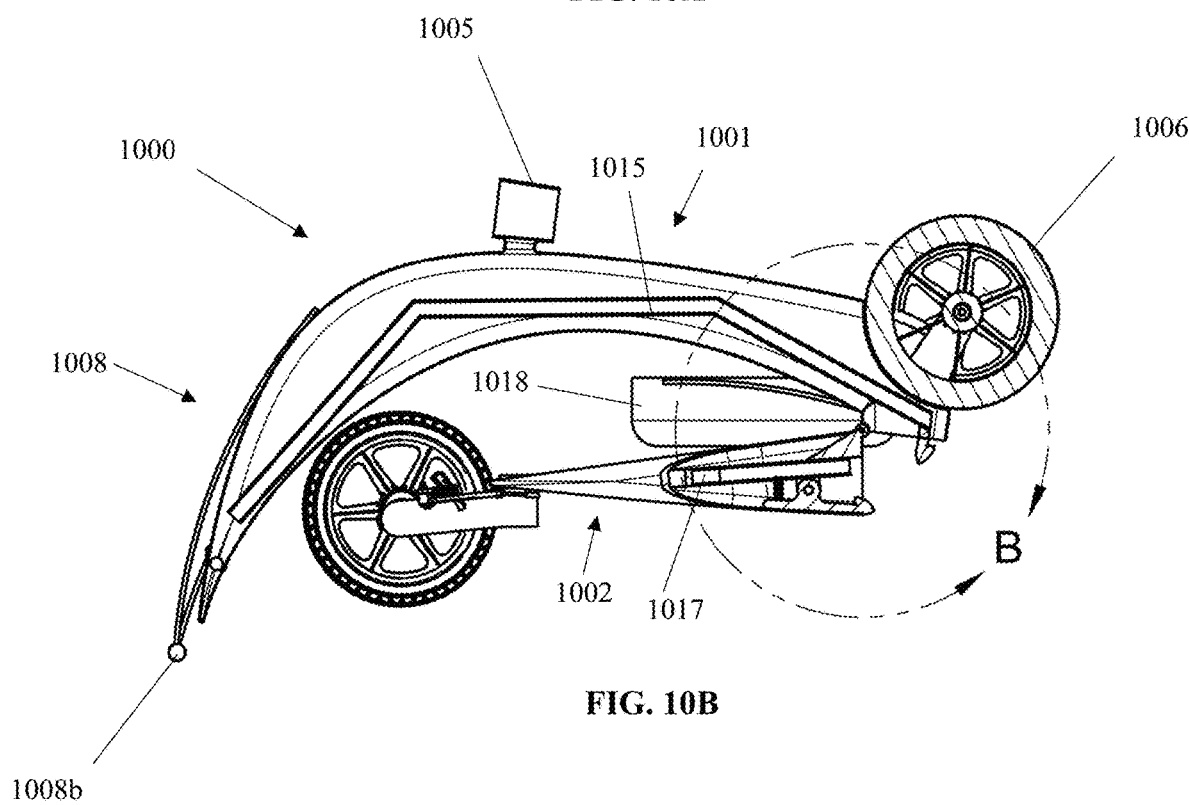
FIG. 10B illustrates the left side cross-sectional view of the disclosed multipurpose riding apparatus along plane A of FIG. 10A in a folded orientation with a reference area B, according to an aspect.
Figure 10C:
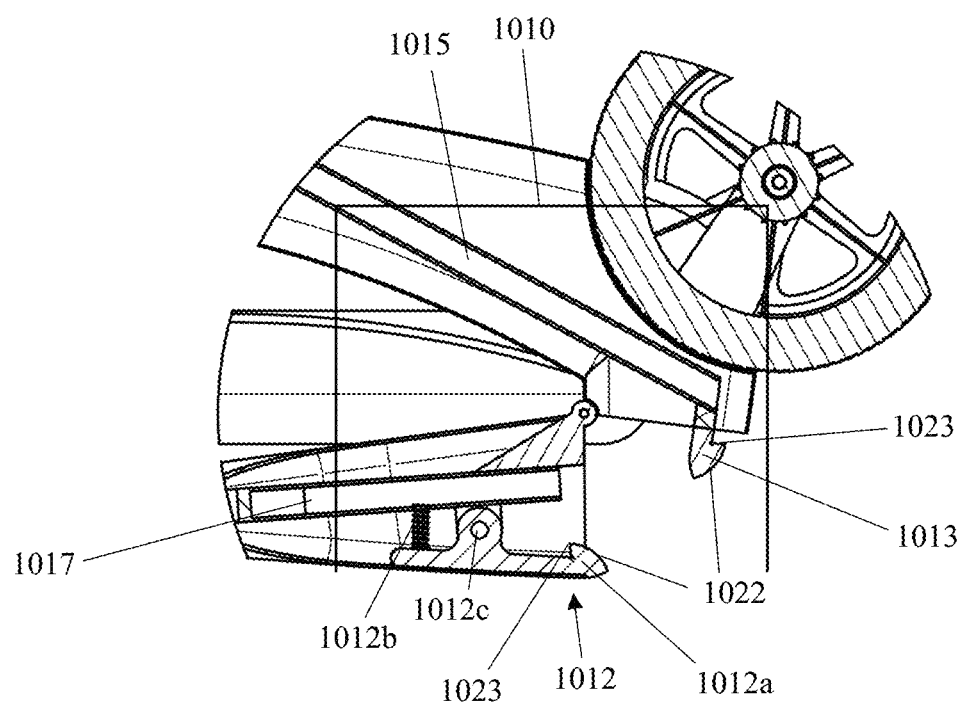
FIG. 10C illustrates the left side cross-sectional view of reference area B from FIG. 10B while the multipurpose riding apparatus is in the folded orientation, according to an aspect.

As disclosed hereinabove, the multipurpose riding apparatus 800 is configured to be selectively folded between a folded, stowed orientation as shown in FIGS. 10A-10C and an unfolded, deployed position as shown in FIG. 8A-8B. As can be seen in reference area B, as shown in FIG. 8B, the multipurpose riding apparatus 800 may be configured to be selectively folded by having the chair body 801 pivotally engaged to the chair base 802. In order to facilitate free pivoting of the chair body about the chair base, a pivot hinge 811 may be associated with and disposed between the chair body 801 and the chair base 802. In an embodiment, the metal body frame 815 may be pivotally engaged with the metal base frame 817 by the disclosed the pivot hinge 811.

Figure 9A:
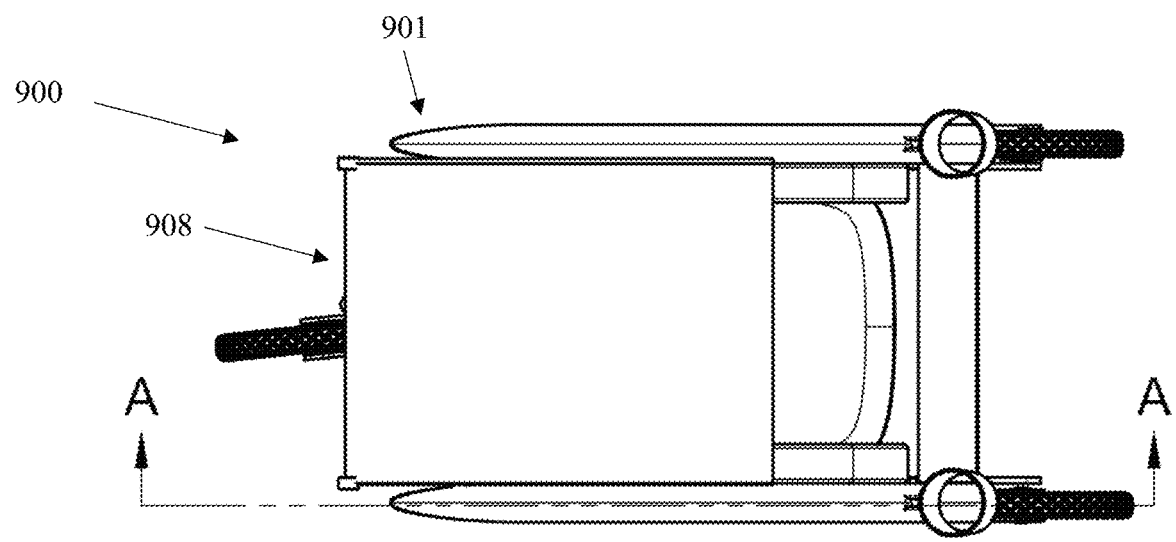
FIG. 9A illustrates a top view of the disclosed multipurpose riding apparatus in an intermediate orientation with a reference plane A.
Figure 9B:
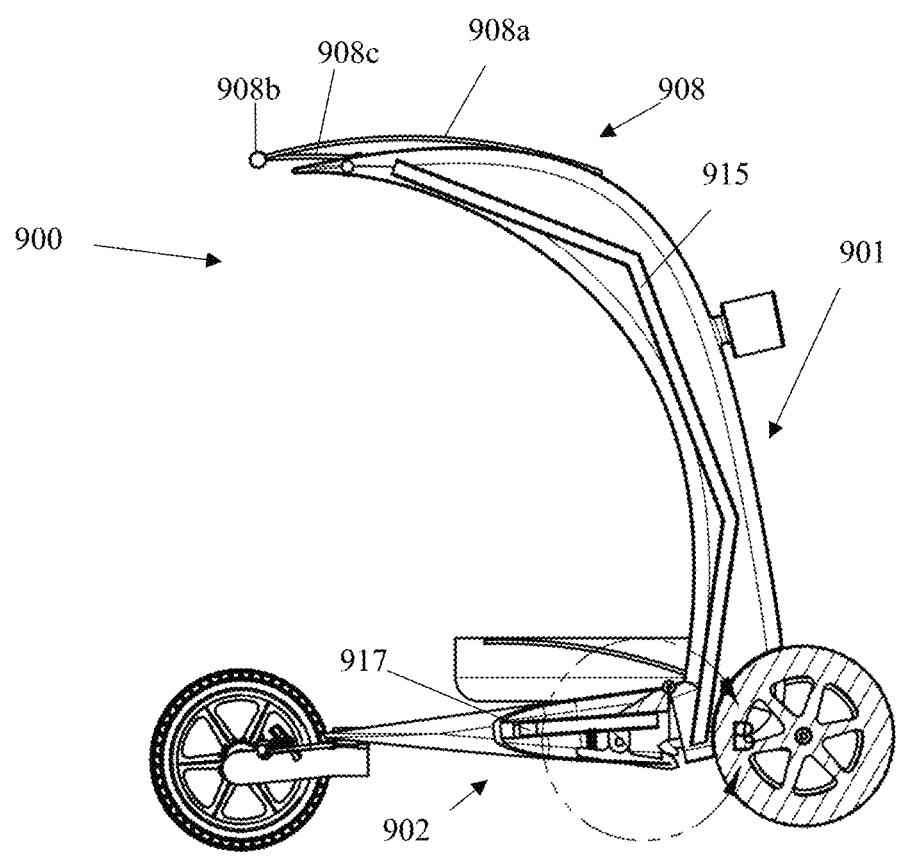
FIG. 9B illustrates the left side cross-sectional view of the disclosed multipurpose riding apparatus along plane A of FIG. 9A in an intermediate orientation with a reference area B, according to an aspect.
Figure 9C:
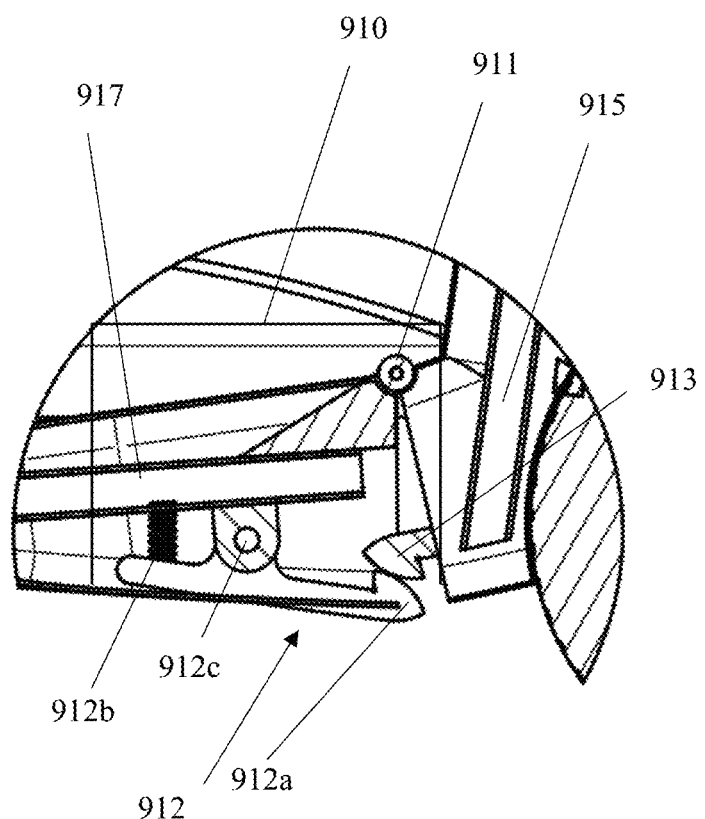
FIG. 9C illustrates the left side cross-sectional view of reference area B from FIG. 9B while the multipurpose riding apparatus is in an intermediate orientation, according to an aspect.

An orientation lock 810 may be responsible for facilitating a secondary, selective engagement between the chair body 801 and the chair base 802 to selectively prevent free pivoting of the chair body 801 about the pivot hinge 811. The orientation lock 810 may be comprised of a body hook 813 and a compression hook 812, wherein the body hook 813 is secured to the chair body 801 and configured to be selectively engaged with the compression hook 812, and the compression hook 812 is pivotally engaged with the chair base 802. The compression hook 812 itself may be comprised of a hook portion 812a attached to the chair base 802 by a spring portion ("compression spring") 812b and a hinge portion 812c. The hook portion 812a may be configured to pivot about the hinge portion 812c through compression of the spring portion 812b, such that hook portion 812a disengages the body hook 813 upon sufficient compression of the spring portion 812b, as seen in FIG. 9A-9C. As such, a user may easily actuate the orientation lock 810 by simply compressing the spring portion 812b. The compression spring 812b may be associated with and disposed between the hook portion 812a and the chair base 802, wherein the hook portion 912a is configured to be selectively disengaged from the body hook 913 through compression of the compression spring 912b and subsequent pivoting of the hook portion 912a, as seen in FIG. 9C. In an embodiment, the compression hook 812 may be pivotally attached to the metal base frame 817 and the body hook 813 may be secured to the metal body frame 815.

It should be understood that the chair body 801 may be attached to the chair base 802 by two different structures; a pivot hinge 811 configured to pivotally secure the chair body 801 to the chair base 802 such that the chair body may pivot about said pivot hinge 811, and an orientation lock 810 configured to selectively prevent free pivoting of the chair body 801 about the chair base 802 upon engagement of the hook portion 812*a* with the body hook 813. As seen in FIG. 8A-8B, the multipurpose riding apparatus 800 may be locked in the deployed orientation while the hook portion 812*a* is engaged with the body hook 813. The disengagement of the hook portion 812*a* from the body hook 813, and thus the partial disengagement of the chair body 801 from the chair base 802 will be discussed in greater detail hereinbelow. It should be understood that other known selective rotation mechanisms or rotation locks, such as rotation locking pins inserted through corresponding portions of the chair body 801 and chair base 802, may be utilized instead of the disclosed orientation lock 810 to selectively prevent multipurpose riding apparatus 800 rotation. In an alternative embodiment, an orientation pin (not shown) may be inserted through coaxially aligned ports within the chair body 801 and the chair base 802 to prevent rotation of the chair body 801 about the chair base 802 or pivot hinge 811.

Unlike the pivoting/rotating behavior of the wheels as described hereinabove for the wheels, the use of the terms "rotating", "pivoting" and the like in the context of the attachment between the chair base 802 and chair body 801, may be used interchangeably, and refer to the same motion articulated in FIG. 8A-10C. Similarly, the terms pivoting and rotating may also be used interchangeably in the context of the orientation lock 810 and its components, wherein the rotating/pivoting of the hook portion 812*a* about the hinge portion 812*c* is articulated in FIGS. 8A-10C

FIG. 9A illustrates a top view of the disclosed multipurpose riding apparatus 900 with a reference plane A. FIG. 9B illustrates the left side cross-sectional view of the disclosed multipurpose riding apparatus 900 along plane A of FIG. 9A in an intermediate orientation with a reference area B, according to an aspect. FIG. 9C illustrates the left side cross-sectional view of reference area B from FIG. 9B while the multipurpose riding apparatus 900 is in an intermediate orientation, according to an aspect. As disclosed hereinabove the disclosed orientation lock 910 is configured to selectively prevent rotation/pivoting of the chair body 901 about the pivot hinge 911. However, upon disengagement of the hook portion 912*a* from the body hook 913 (through compression of the spring portion 912*b*, as disclosed hereinabove) the multipurpose riding apparatus 900 may no longer be locked in the deployed position. As such, the chair body 901 may be allowed to rotate freely, such that the multipurpose riding apparatus 900 may be folded into a folded, stowed position, as seen in FIG. 10A-10C.

It should be understood that the hook portion 912*a* and the body hook 913 may be configured engage with each other by simply rotating the multipurpose riding apparatus 900 into the deployed position, as seen in FIG. 8A-8B, from the folded or intermediate position. In contrast, the hook portion 912*a* may only be configured to disengage from the body hook 913 by compressing the spring portion 912*b*, as seen in FIG. 9C. This compression of the spring portion 912*b* results in the rotation of the hook portion 912*a* about the hinge portion 912*c*, and subsequent disengagement of the hook portion 912*a* from the body hook 913. The hook portion 912*a* and body hook 913 are configured to prevent the multipurpose riding apparatus 900 from folding out of the deployed orientation unexpectedly, thus preventing its unintended collapse during use. While the multipurpose riding apparatus 900 is in this intermediate position, the body hook 913 and hook portion 912*a* are configured to slide over each other, as will be discussed in greater detail hereinbelow. The folded, stowed orientation of the multipurpose riding apparatus 900 will be discussed in greater detail hereinbelow.

As can also be seen in FIG. 9B, in certain embodiments the passenger shade 908 may be collapsed while in the intermediate (FIG. 9B) or stowed positions (FIG. 10B) in order to further minimize overall size of the multipurpose riding apparatus 900. As described hereinabove, the shade canopy 908*a* may be rotated about the shade pivot 908*b*. The shade mount 908*c* may be pivotally engaged with the chair body 901 and configured to selectively pivot as well, as seen in FIG. 9B, to further minimize the space occupied by the passenger shade 908. The same folded configuration of passenger shade 908 may be maintained in the stowed, folded position shown in FIG. 10B.

FIG. 10A illustrates a top view of the disclosed multipurpose riding apparatus 1000 in a folded orientation with a reference plane A. FIG. 10B illustrates the left side cross-sectional view of the disclosed multipurpose riding apparatus 1000 along plane A of FIG. 10A in the folded orientation with a reference area B, according to an aspect. FIG. 10C illustrates the left side cross-sectional view of reference area B from FIG. 10B while the multipurpose riding apparatus 1000 is in the folded orientation, according to an aspect. As disclosed hereinabove, the rotation of the chair body 1001 about the chair base 1002 may be restricted between the two potential orientations, the deployed orientation, as seen in FIGS. 8A-8B and the stowed orientation, as seen in FIG. 10A-10C. When the multipurpose riding apparatus 1000 is folded into the stowed orientation, it may be easily stored and transported by reducing the overall dimensions of the multipurpose riding apparatus 1000. As described in FIG. 9A-9C, the passenger shade 1008 may be folded while in the stowed position to further minimize the space occupied by the multipurpose riding apparatus 1000.

As can be seen in FIG. 10C, the hook portion 1012*a* may be fully disengaged from the body hook 1013 as a result of the compression of the compression spring 1012*b*, and subsequent rotation of the hook portion 1012*b* about the hinge portion 1012*c*. As described above, the multipurpose riding apparatus 1000 may be redeployed without directly interacting with the compression hook, by simply rotating the chair body back into the deployed position as shown in FIG. 8A, and allowing hook portion 1012*a* to slide over the body hook 1013 to fully reengage the hook portion 1012*a* with the body hook 1013. The hook portion 1012*a* and body hook 1013 are both suitably shaped, as seen in FIG. 8A-10C to facilitate this sliding over and subsequent reengagement of the hook portion 1012*a* with body hook 1013, both of which have rounded engagement surfaces 1022 (that slide over each other) that terminate is locking notches 1023 (that interlock and engage with each other).

As disclosed hereabove, the general dimensions of the multipurpose riding apparatus 1000 may be reduced while it is in the stowed orientation as depicted in FIG. 10B. The width of the multipurpose riding apparatus (the distance between the most distal lateral edges of the two opposing cup holders 1005) may remain the same between different orientations (e.g., about 22 inches), but the height and length may differ between the deployed and stowed orientations. The width of the multipurpose riding apparatus 1000 may alternatively be defined between the outer most lateral edges of the front wheels 1006, which may be maintained at about 20 inches regardless of current orientation of the multipurpose riding apparatus 1000. The height of the multipurpose riding apparatus 1000 may be defined as the distance between the topmost point of the cup holder 1005 and the bottommost point shade pivot 1008b in FIG. 10B, whereas the length of the multipurpose riding apparatus 1000 may be defined as the distance between the front most point of the front wheel 1006 and the back most point of the shade pivot 1008b in FIG. 10B, while in the stowed position. In an embodiment, the multipurpose riding apparatus may have a height of about 28 inches and a length of about 52 inches while in the stowed orientation.

The multipurpose riding apparatus 1000 may be provided with a variety of features that enable it to provide a safe and comfortable user experience for both a standing user and a sitting user. For the standing user, a standing platform, such as standing platform 102a of FIG. 1A, may allow the standing user to ride the multipurpose riding apparatus 1000 around while in motion, while the easily accessible brake, such as brake 109 of FIG. 1A, attached to the chair body 1001 may provide the standing user with a rapid and efficient means of stopping the multipurpose riding apparatus 1000. For the sitting user, a variety of amenities such as cupholders, foldable armrests and a foldable passengers shade 1008 may be provided to hold the sitting user's beverage(s) while facilitating a comfortable sitting experience, respectively. The storage basket 1018 disposed below the seat may provide a storage area that is easily accessible by both the standing user and the sitting user. Finally, while the multipurpose riding apparatus 1000 is not in use (e.g., nobody is in the seat/standing on the standing platform) the orientation lock 1010 may be disengaged as disclosed hereinabove to allow the multipurpose riding apparatus 1000 to be folded into a more space efficient configuration to allow for easy transit/storage. The various functionalities of the disclosed multipurpose riding apparatus 1000 allow it to be utilized as a stroller, scooter and/or storage receptacle, all in a singular device as disclosed herein.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A multipurpose riding apparatus comprising:
   a chair body;
   a seat associated with the chair body, wherein the seat is configured to hold a sitting user;
   a chair base pivotally attached to the chair body, wherein the chair base is configured to be stood upon by a standing user to allow the standing user to travel on the multipurpose riding apparatus;
   a pair of front wheels rotationally attached to a front end of the multipurpose riding apparatus, wherein the front wheels are configured to rotate about a front wheel rotational axis;

a back wheel rotationally attached to the chair base, wherein the back wheel is configured to rotate about a back wheel rotational axis, wherein the back wheel is further configured to pivot about the chair base to facilitate directional turning of the multipurpose riding apparatus; and a brake attached to the chair body and associated with the back wheel, wherein the brake is configured to be selectively actuated to prevent rotation of the back wheel about the back wheel rotational axis;

wherein the multipurpose riding apparatus is configured to be selectively locked into a deployed orientation.

2. The multipurpose riding apparatus of claim 1, wherein the selective locking of the multipurpose riding apparatus into the deployed orientation is facilitated by an orientation lock comprising a body hook attached to the chair body, and a compression hook attached to the chair base, the compression hook comprising a hook portion pivotally attached to the chair base and a compression spring associated with and disposed between the hook portion and the chair base, wherein the compression hook is configured to be selectively disengaged from the body hook through compression of the compression spring and subsequent pivoting of the hook portion.

3. The multipurpose riding apparatus of claim 1, wherein the pivoting of the back wheel is facilitated by a wheel pivot joint, wherein the wheel pivot joint is pivotally attached to the chair base and the back wheel is rotationally attached to the wheel pivot joint.

4. The multipurpose riding apparatus of claim 1, further comprising a passenger shade associated with the chair body, wherein the passenger shade is disposed above the seat.

5. The multipurpose riding apparatus of claim 1, wherein the chair body is comprised of a body clamshell and a metal body frame encased within the body clamshell, and the chair base is comprised of a base clamshell and a metal base frame encased within the base clamshell.

6. The multipurpose riding apparatus of claim 5, wherein the metal body frame is pivotally attached to the metal base frame by a pivot hinge.

7. The multipurpose riding apparatus of claim 1, wherein the chair body is comprised of a pair of handles configured to be held by the standing user.

8. A multipurpose riding apparatus comprising:
a chair body;
a seat associated with the chair body, wherein the seat is configured to hold a sitting user;
a chair base pivotally attached to the chair body;
a pair of front wheels rotationally attached to a front end of the multipurpose riding apparatus;
a back wheel rotationally attached to the chair base, wherein the back wheel is pivotally attached to the chair base, such that the back wheel is configured to rotate about the back wheel rotational axis and pivot orthogonally to the back wheel rotational axis to facilitate directional turning of the multipurpose riding apparatus during travel; and
a brake attached to the chair body and associated with the back wheel, wherein the brake is configured to selectively prevent rotation of the back wheel about a back wheel rotational axis;
wherein the multipurpose riding apparatus is configured to be selectively locked into a deployed orientation and the chair base is configured to be stood upon by a standing user to allow the standing user to travel on the multipurpose riding apparatus.

9. The multipurpose riding apparatus of claim 8, wherein the selective locking of the multipurpose riding apparatus into the deployed orientation is facilitated by an orientation lock comprising a body hook attached to the chair body and a compression hook attached to the chair base, wherein the orientation lock may selectively lock the multipurpose riding apparatus into the deployed position through selective engagement of the compression hook with the body hook.

10. The multipurpose riding apparatus of claim 8, further comprising a storage basket associated with the chair base and disposed below the seat.

11. The multipurpose riding apparatus of claim 8, wherein the brake is comprised of a brake handle associated with the chair body, a brake cable associated with the brake handle, and a braking device associated with the brake cable, wherein the braking device is further associated with the back wheel, such that upon actuation of the brake handle, the braking device is configured to stop rotation of the back wheel about the back wheel rotational axis.

12. The multipurpose riding apparatus of claim 8, further comprising a passenger shade associated with the chair body, wherein the passenger shade is disposed above the seat and configured to protect the sitting user.

13. The multipurpose riding apparatus of claim 12, wherein the passenger shade is further configured to be selectively folded such that it no longer protects the sitting user.

14. The multipurpose riding apparatus of claim 8, wherein the chair base is comprised of a standing platform configured to hold the standing user.

15. The multipurpose riding apparatus of claim 8, further comprising a pair of cupholders and a pair of armrests associated with the chair body, wherein the armrests are configured to support a sitting user's arms.

16. The multipurpose riding apparatus of claim 8, wherein the chair body is comprised of a metal body frame encased within a plastic body clamshell, and the chair base is comprised of a metal base frame encased within a plastic base clamshell.

17. A multipurpose riding apparatus comprising:
a chair body;
a seat associated with the chair body;
a chair base pivotally attached to the chair body;
a back wheel rotationally attached to the chair base; and
a brake attached to the chair body and associated with the back wheel, wherein the brake is configured to selectively prevent rotation of the back wheel about a back wheel rotational axis;
wherein the multipurpose riding apparatus is configured to be selectively locked into a deployed orientation and the selective locking of the multipurpose riding apparatus into the deployed orientation is facilitated by an orientation lock comprising a body hook attached to the chair body, and a compression hook attached to the chair base, the compression hook comprising a hook portion pivotally attached to the chair base and a compression spring associated with and disposed between the hook portion and the chair base, wherein the compression hook is configured to be selectively disengaged from the body hook through compression of the compression spring and subsequent pivoting of the hook portion.

18. The multipurpose riding apparatus of claim 17, wherein the chair base is comprised of a standing platform configured to hold a standing user.

* * * * *